United States Patent

Turck et al.

[11] Patent Number: 5,368,326
[45] Date of Patent: Nov. 29, 1994

[54] APPARATUS FOR INSURING NEUTRAL STABILIZER BAR INSTALLATION

[75] Inventors: William B. Turck, Taylor; Manfred C. Rumpel, Bloomfield Hills, both of Mich.

[73] Assignee: Ford Motor Company, Dearborn, Mich.

[21] Appl. No.: 84,114

[22] Filed: Jul. 1, 1993

[51] Int. Cl.$^5$ .............................................. B60G 21/00
[52] U.S. Cl. ................................. 280/689; 280/723; 267/277
[58] Field of Search ................ 267/277, 278; 280/689, 280/723

[56] References Cited

U.S. PATENT DOCUMENTS

| | | | |
|---|---|---|---|
| 1,915,134 | 6/1933 | MacPherson | 280/723 |
| 2,290,034 | 7/1942 | Carter | 267/265 |
| 2,596,922 | 5/1952 | Thomas | 280/664 |
| 2,961,253 | 11/1960 | Allison | 280/665 |
| 3,432,158 | 3/1969 | Goodwin | 267/278 |
| 3,856,286 | 12/1974 | Mitchell | 267/273 |
| 4,033,605 | 7/1977 | Smith et al. | 280/664 |
| 4,066,278 | 1/1978 | Takagi | 280/710 |
| 4,550,932 | 11/1985 | Vilain et al. | 280/689 |
| 4,621,834 | 11/1986 | Aubry et al. | 280/723 |
| 4,632,423 | 12/1986 | Tanahashi | 280/689 |
| 4,784,406 | 11/1988 | Stinson | 280/665 |
| 4,842,298 | 6/1989 | Jarvis | 280/689 |

OTHER PUBLICATIONS

Mustang-Car Shop Manual Ford Parts & Service Div. Service Publications 1991, Section 14–05.

*Primary Examiner*—Kenneth R. Rice

[57] ABSTRACT

An adjustable attachment apparatus 30 is disclosed for use in a motor vehicle 10 for attaching a stabilizer bar 14 to the vehicle to provide variable positioning of the stabilizer bar on the vehicle to prevent a pre-loaded condition in the stabilizer bar.

12 Claims, 3 Drawing Sheets

APPARATUS FOR INSURING NEUTRAL STABILIZER BAR INSTALLATION

BACKGROUND OF THE INVENTION

1. Field of the Invention

This invention generally relates to suspension systems for motor vehicles. More specifically, the present invention relates to an adjustable attachment for securing a stabilizer bar to a vehicle.

2. Disclosure Information

Torsional stabilizer bars have proven useful in vehicles for many years. Such stabilizer bars commonly incorporate a transverse torsion bar segment pivotally attached and interconnecting the vehicle chassis and suspension components. Stabilizer bars generally operate to increase the roll stiffness of the vehicle and improve the steering stability of the vehicle by resisting differential movement of laterally opposed wheels relative to the vehicle chassis. One example of a stabilizer bar is shown in U.S. Pat. No. 4,648,620, which is assigned to the assignee of the present invention. Ford Motor Company Shop Manual for a 1991 model Mustang automobile shows a stabilizer bar mounted at the front suspension at p.14-05-5, and a stabilizer bar mounted at the rear suspension at p.14-05-5.

One of the drawbacks inherent in any suspension system is friction between moving suspension components connecting the wheel to the chassis. A particularly undesirable ride and noise characteristic can be related to the "static" friction of the suspension system. Static friction is best characterized by the amount of force necessary to initiate suspension movement on a stationary vehicle under curb load. Curb load defines the standard design payload for the vehicle, including a predetermined amount of fuel, passengers, and cargo.

Stabilizer bars may contribute to the static friction component in the suspension. Engineers typically design stabilizer bars so there is no load on the stabilizer bar when the vehicle is stationery at curb load. This is referred to as the neutral position. If there is any load in the stabilizer bar under this condition, it is referred to as pre-load. Pre-load reacts throughout the suspension, possibly causing binding in the suspension joints or increasing the static friction and tilting the vehicle from side-to-side.

FIG. 1 shows a motor vehicle 10 with a front suspension 12 utilizing a stabilizer bar 14 attached in a conventional fashion. Brackets 16 support the central portion of the stabilizer bar 14 from the chassis 18 while fixed length links 20 connect the ends of the stabilizer bar 14 to suspension members 22. However, the chassis 18, suspension members 22, and stabilizer bar 14 and the respective attachment points are built to specified design tolerances. In order for the stabilizer bar to be installed in the vehicle in the neutral position, the mounting points on the chassis 18 and the suspension members 22 must be co-planar with the plane defined by the mounting points of the unloaded stabilizer bar 14. Understanding the principle that three points defined a plane and the fact that there are four attachment points, combined with the manufacturing variations of each point, it can be seen that these planes are rarely co-planar. Therefore, the stabilizer is pre-loaded by various amounts when it is installed in the vehicle in the neutral position. In addition to affecting the friction in the suspension, this pre-loaded condition may also cause the chassis to tilt from one side of the vehicle to be at a different height than the other when the vehicle is at rest.

Designers have employed various means to reduce the undesirable friction in the suspension system. One example is that shown in previously mentioned U.S. Pat. No. 4,784,406, in which the stabilizer bar attaches to a MacPherson strut such that when the wheels of the suspension go into a jounce position the stabilizer bar exerts force against the strut in a direction tending to minimize friction within the strut. The design, however, does not teach reducing static friction in any other suspension components.

In order for stabilizer bar having more than three attachment points to be installed in a neutral position, the additional attachment points must fall within a single plane defined by any three of those points. Furthermore, that plane must be co-planar to the plane created by any three of the four corresponding attachment points on the vehicle. Attaching the stabilizer bar in accordance with the present invention minimizes the preload in the stabilizer bar by automatically insuring the stabilizer bar is in a neutral position at curb load. This, in turn, reduces the operating friction of the suspension system to which the stabilizer bar is attached and prevents the stabilizer bar from forcing the vehicle into an tilted condition.

It would be desirable to provide an apparatus for insuring the neutral installation of a stabilizer bar to substantially reduce the static friction imposed on the suspension system.

SUMMARY OF THE INVENTION

The present invention advances beyond the above described systems by providing a suspension attachment apparatus for use in a motor vehicle having a chassis, a suspension member depending pivotally from the chassis, and a stabilizer bar interposed and connecting the chassis and the suspension member. The stabilizer bar includes a torsional reaction segment running generally transversely across the vehicle and left and right crank arms, each having a first end attached to the torsional segment of the stabilizer bar and a second end for attaching to the vehicle. The apparatus comprises attachment means for attaching the stabilizer bar to the vehicle. The apparatus further comprises positioning means for providing variable positioning of the stabilizer bar on the vehicle to prevent a pre-loaded condition in the stabilizer bar.

It is an advantage of the present invention to reduce friction within the suspension by providing a self-adjusting attachment for connecting the stabilizer bar in a neutral position to a vehicle.

Other objects, features and advantages of the present invention will become apparent to those skilled in the art from the drawings, detailed description and claims which follow.

DETAILED DESCRIPTION OF THE PREFERRED EMBODIMENTS

Figure 1:
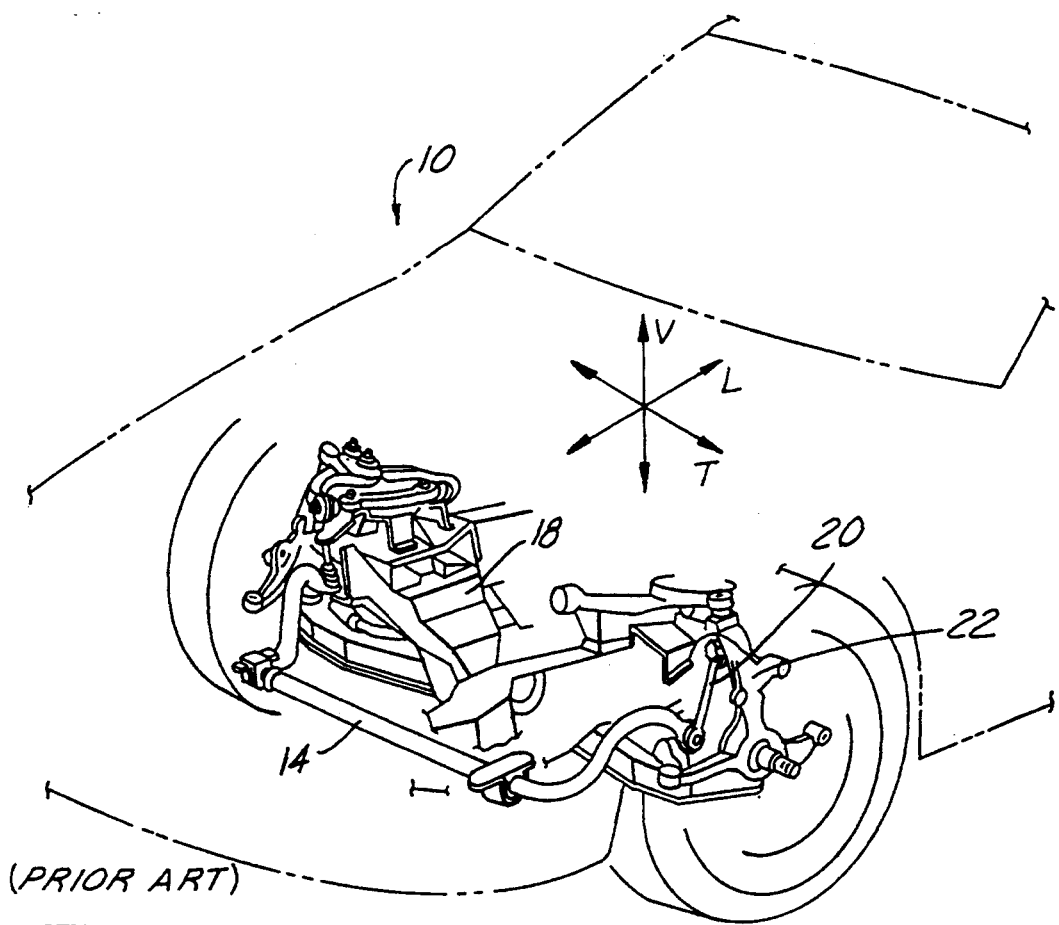
FIG. 1 is a perspective view of a motor vehicle front suspension including a stabilizer bar according to the prior art.
Figure 2:
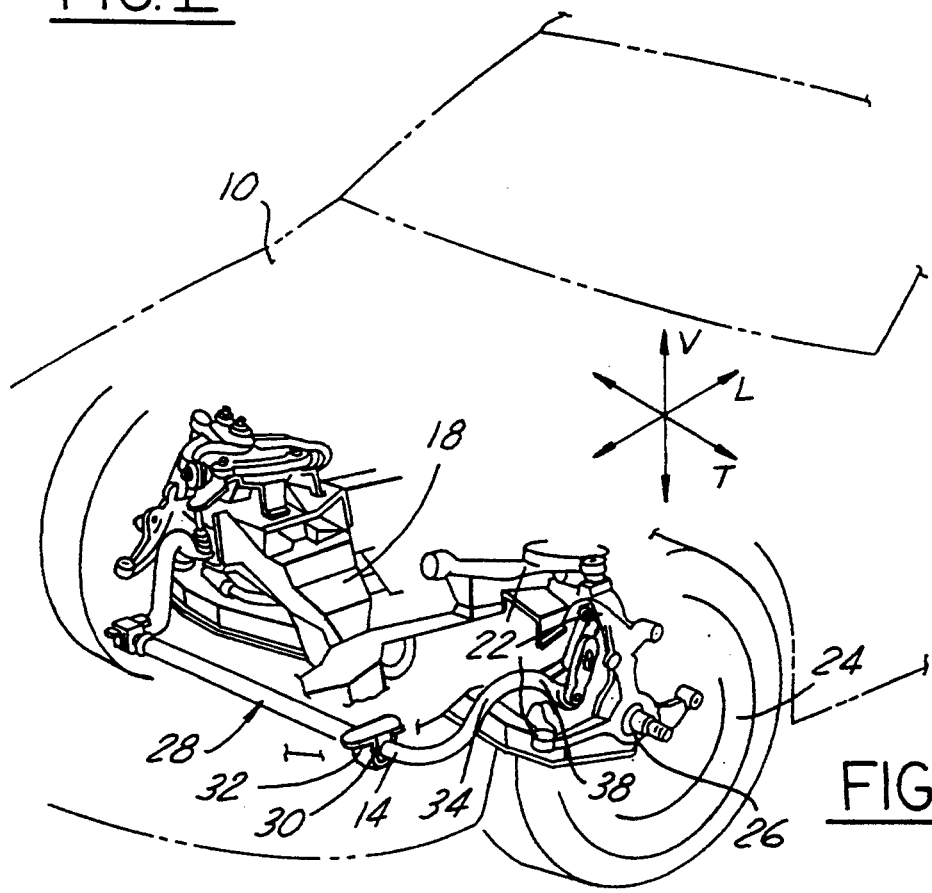
FIG. 2 is a perspective view of an automotive suspension including a stabilizer bar attachment link according to the present invention.

Referring now to FIG. 2, a front suspension 12 of a motor vehicle 10 includes a stabilizer bar 14, attached in accordance with the present invention. For simplicity, the following description is limited to the left side of the vehicle, it being understood that the right side is the same, except where noted. The three mutually perpendicular axes of the vehicle, longitudinal, transverse and vertical, are shown in FIG. 2 by lines L—L, T—T, and V—V, respectively. A road wheel 24 is rotatably mounted to a spindle 26, which is attached to a suspension member 22 depending pivotally from the chassis 18. The stabilizer bar 14 consists of a torsional reaction segment 28 running generally transverse to the longitudinal axis of the vehicle and is pivotally mounted to the chassis by a conventional elastomeric bearing 30 maintained within a bracket 32. The torsional reaction segment 28 of the stabilizer bar 14 is joined with crank arms 34 disposed at either end of segment. The crank arm extends generally perpendicular to the torsional reaction segment 28, parallel to the longitudinal axis of the vehicle 10 and an eye formed in the end of the arm. FIG. 2 shows one embodiment of the present invention utilizing an adjustable attachment apparatus 38 to replace the conventional fixed link 20 shown in FIG. 1.

As shown in FIGS. 3-7, several alternative embodiments of the present invention are contemplated for replacing a conventional fixed link used in attaching a stabilizer bar 14 to the vehicle 10. Specifically, each of the attachments include a first elongate member 40 having a spherical rod end 42 disposed on one end thereof for attaching to the suspension member 22. Additionally, a second elongate member 46 having a spherical rod end 42 disposed on one end thereof for engaging the eye 36 disposed on the crank arm 34 of the stabilizer bar 14. Those skilled in the art will appreciate the means of attaching the stabilizer bar 14 to the second member 46 and the first member 40 to the suspension 22 may comprise other mounting means conventional to stabilizer bar design and application. Each of the elongate members can be made from materials capable of sustaining compressive and tensile loads. Such materials include, but are not limited to, steel, aluminum, and high strength synthetic polymeric materials such as high strength polycarbonate.

Each of the embodiments further includes slidable interconnecting means 50 which permits the first member 40 to slidably engage the second member 46, such that limited sliding of the two members is permitted relative one another in the direction of the major axis of the elongate members when combined. The slidable interconnecting means 50 can further be tightened to prevent further sliding and behave substantially as a rigid link. Each of the alternative embodiments shown in FIGS. 3-7 will now be individually described.

Figure 3:
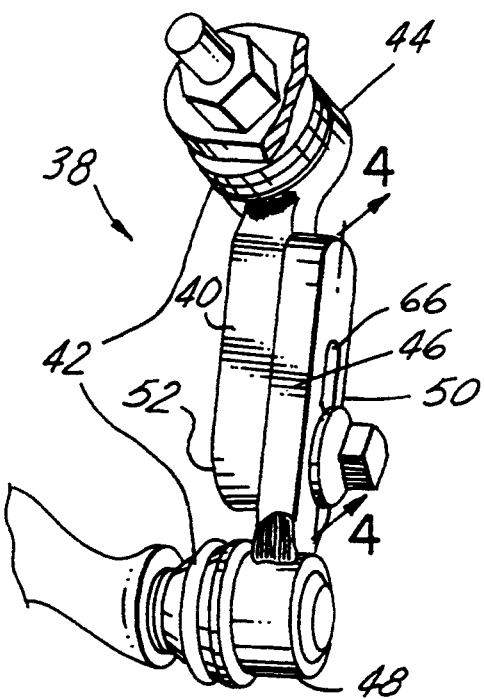
FIG. 3 is a perspective view of one embodiment of a stabilizer bar attachment link according to the present invention.
Figure 4:
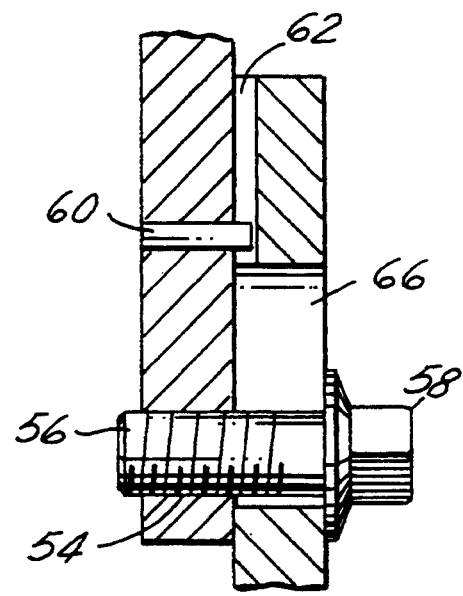
FIG. 4 is a cross sectional view taken along line 3—3 of FIG. 3.

As shown in FIGS. 3 and 4, first elongate member 40 further includes a threaded aperture 54 for receiving a threaded shank 56 of a threaded fastener 58 therethrough. In the preferred embodiment, the aperture 54 is disposed at an end of the first member 40 opposite the spherical rod portion, but may be located any where intermediate as well.

As further shown in FIG. 4, the second member 46 includes an elongated aperture 66 extending substantially the length of the second member 66, the length of the aperture 66 being determinative of the range of adjustability of the apparatus. The aperture 66 width is to be larger than the diameter of the threaded shank 56, to allow substantially free sliding between the threaded shank 56 and the second elongate member 46. The second member 46 of the present embodiment has an approximate length of three inches with an elongate aperture 66 length of approximately two inches.

Also shown in FIGS. 3 and 4, first elongate member 40 includes a guide dowel 60 disposed substantially at its midpoint for engaging a groove 62 extending a predetermined distance in the second elongate member 46 to provide axial alignment of the first member 40 relative to the second member 46. In the preferred embodiment, the groove 62 extends from the end opposite the spherical rod portion up to the elongated aperture 66, but may stop or start any where intermediate as well. It should be apparent to one skilled in the art that substitution of a second threaded shank 56, fastener 58 and threaded aperture 54 for the dowel pin 60 and groove 62 will provide equivalent functionality.

Figure 5:
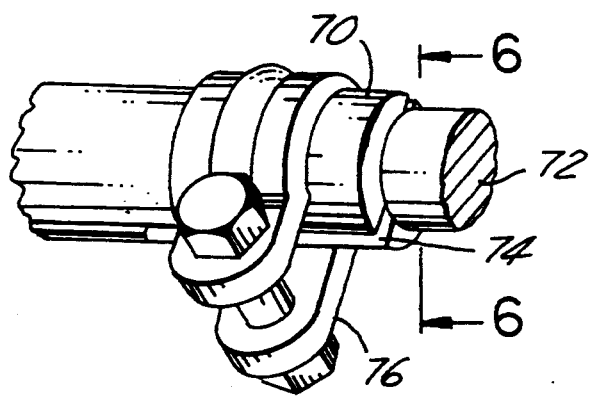
FIG. 5 is a perspective view of one embodiment of a stabilizer bar attachment link according to the present invention.
Figure 6:
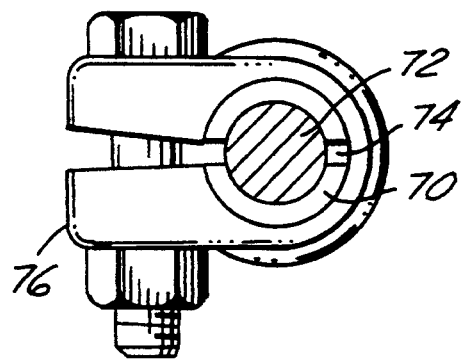
FIG. 6 is a perspective view of one embodiment of a stabilizer bar attachment like according to the present invention.
Figure 7:
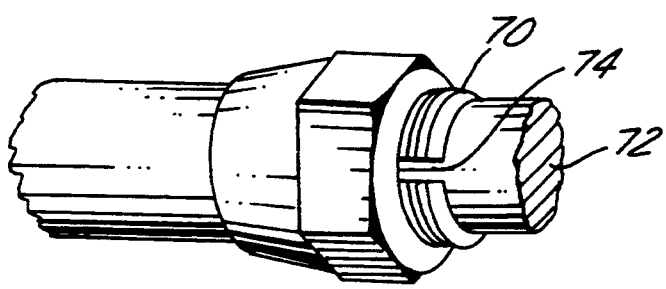
FIG. 7 is a cross sectional view taken along line 6—6 of FIG. 6.

Embodiments shown in FIGS. 5-7 show alternative slidable interconnecting means. Each utilizes a ferrule joint 68 comprising a tube 70 having an inner diameter substantially equal to or slightly larger than the external diameter of the rod 72. To facilitate securing the two members together, the tube end may have relief slots 74 to reduce the force required to retain the rod 72 in the tube 70. FIGS. 5 and 6 show a conventional tube clamp 78 for generating the inward radial force on the circumferential of the tube 70 to retain the rod 72.

Alternatively, FIG. 7 shows an embodiment having threads on the tube end to receive a threaded nut 80, such that upon tightening the threaded nut 80 a radial force is generated on the tubes 70 circumference. It should be apparent to one skilled in the art that still further variations exist to provide sliding interconnecting means.

Figure 8:
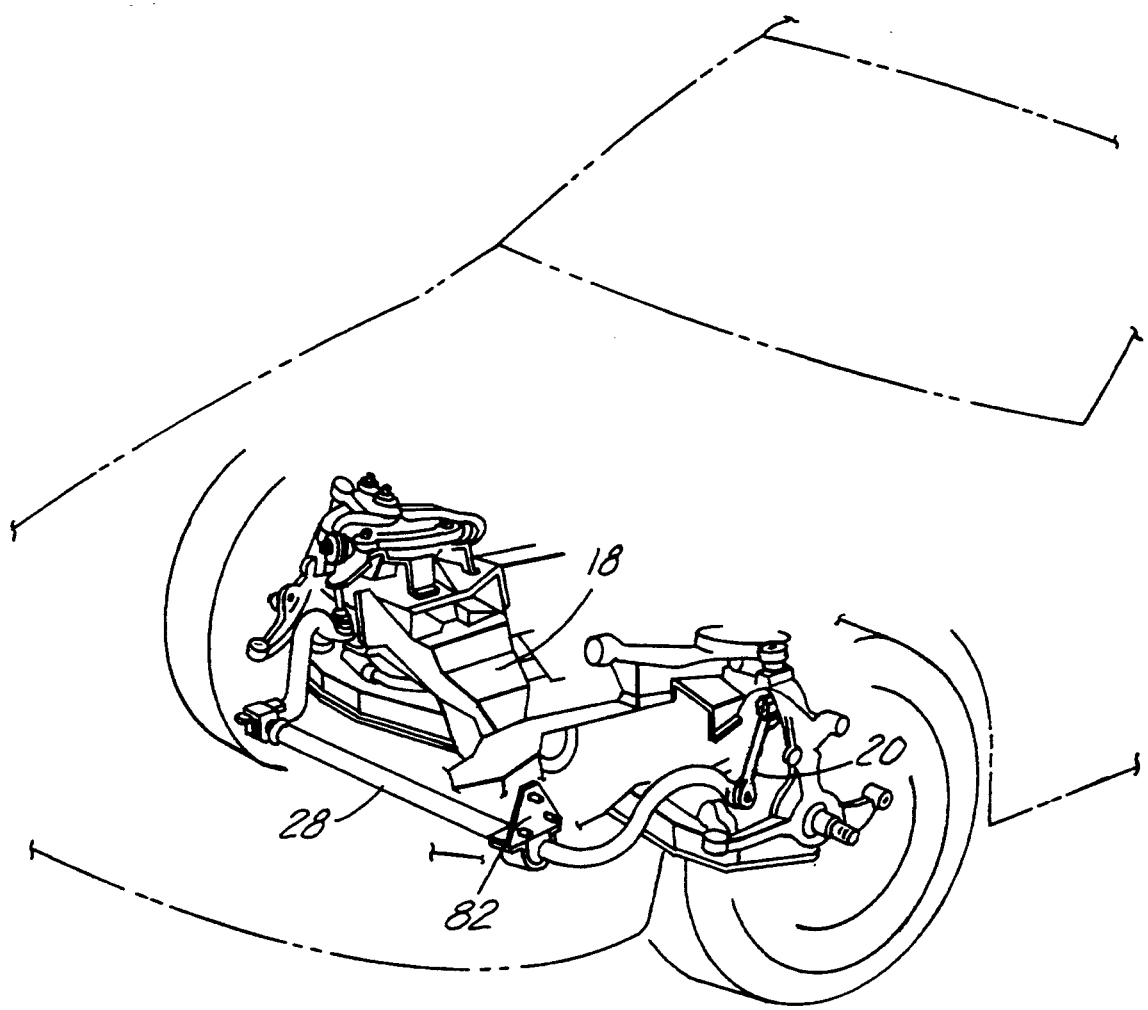
FIG. 8 is a perspective view of an automotive suspension including a stabilizer bar attachment according to the present invention.
Figure 9:
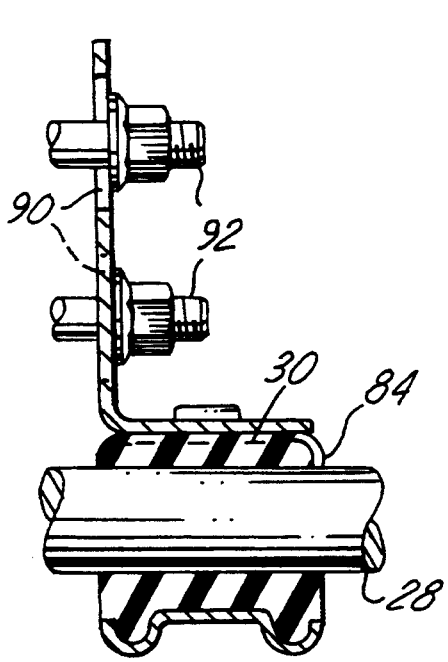
FIG. 9 is a cross sectional view taken along line 9—9 of FIG. 10.
Figure 10:
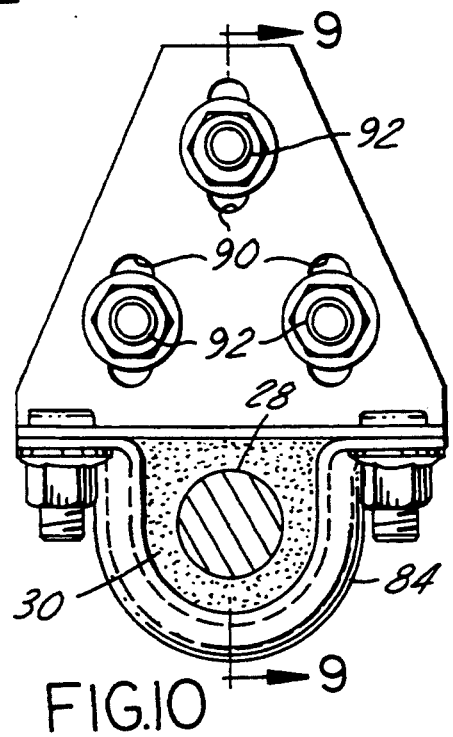
FIG. 10 is a perspective view of one embodiment of a stabilizer bar attachment according to the present invention.

FIG. 8 shows an alternative embodiment of the present invention for suspensions that do not utilize any link, or the use of a conventional fixed length link is desirable to replace a conventional fixed link. Here, the adjustable attachment apparatus provides a slidably adjustable platform 82 disposed between a conventional bracket 84 and the chassis 18. As is shown, the platform 82 has a substantially vertical leg 86 for attachment to the chassis 18 and a substantially horizontal leg 88 for attachment of the bracket 84. The vertical leg 86 has three elongate apertures 90 having their elongate axes substantially parallel to each other and parallel to the vertical plane of the vertical leg. The threaded shank fasteners 92 pass through each of the elongate apertures 90 and securely attaching the platform 82 to the chassis 18. The width of the apertures 90 provide clearance for the threaded shank fasteners 92 to pass through without binding the vertical motion of the platform 82. Conventional fasteners attach the conventional bracket 84 to the horizontal leg 88.

The operation of the attachment apparatus, whether replacing a conventional link or providing a mounting platform for a bracket, allows the stabilizer bar 14, to be secured in the vehicle in a neutral position with no pre-load. The stabilizer bar 14 may first be installed in the vehicle 10 by securing the conventional attachments and loosely securing the adjustable attachment. As the vehicle is loaded to curb load, the adjustable attachment will slide, allowing the stabilizer bar to remain unloaded. When the vehicle obtains curb, the adjustable apparatus is simply secured in the neutral position.

Various other modifications and permutations of the present invention, no doubt, will occur to those skilled in the art. For instance, those skilled in the art will appreciate, in view of this disclosure, that although a steerable, independent front suspension is illustrated in FIGS. 2 and 8, an adjustable attachment for stabilizer bars according to the present invention may be used on many variations of a suspension. For example, on a solid live axle, non-steerable rear suspension the torsional reaction segment of the stabilizer bar may be attached to the axle by the bracket and adjustment provided as described above. Further, a stabilizer bar need not utilize attachment links, attaching directly to the suspension member for the knuckle. In these instances, the adjustability would be provided at the bracket adjustable attachment platform. Therefore, it is the following claims, including all equivalents, which define the scope of the present invention.

What is claimed is:

1. A suspension attachment apparatus for use in a motor vehicle having a longitudinal axis, a vertical axis and a transverse axis, each being mutually orthogonal, a chassis, a suspension member depending pivotally from the chassis, a stabilizer bar interposed and connecting the chassis and the suspension member, the stabilizer including a torsional reaction segment running generally transversely across the vehicle and left and right crank arms, each having a first end attached to the torsional segment of the stabilizer bar and a second end adapted for attachment to the vehicle, said suspension attachment apparatus comprising:

attachment means for attaching the stabilizer bar to the vehicle; and slidable positioning means for self-adjusting the stabilizer bar to a neutral load position at a predetermined vehicle load condition, said positioning means further adapted to be secured in said neutral position.

2. An apparatus according to claim 1, wherein said positioning means comprises:

a first elongate member;

a second elongate member; and adjustable interconnecting means for connecting the first elongate member with the second elongate member, said first and second elongate members being operative to slidably engage one another along an axis parallel to the elongate axes of said members, said slidable interconnecting means being further operative to create a single rigid link upon fastening said first and second members together and to interconnect the stabilizer bar to the vehicle to prevent a pre-loaded condition in the stabilizer bar.

3. An apparatus according to claim 1, wherein said positioning means comprises:

an elastomeric body having an aperture adapted to receive the combination torsional reaction segment therethrough;

a bracket for securing the stabilizer bar within the elastomeric body; and adjustable interconnecting means for connecting the bracket to the vehicle, said interconnecting means being configured to be adjustable in a plane generally parallel to the vertical axis of the vehicle, to prevent a pre-loaded condition in the stabilizer bar.

4. An apparatus according to claim 2, wherein said interconnecting means comprises a guide dowel and a groove adapted to engage said dowel.

5. An apparatus according to claim 2, wherein said interconnecting means comprises a threaded shank fastener and a threaded aperture adapted to engage said threaded shank fastener, said fastener being operative to fasten said first and second members together.

6. An apparatus according to claim 2, wherein said interconnecting means comprises a ferrule joint adapted to fasten said first and second members together.

7. An apparatus according to claim 3, wherein said interconnecting means comprises:

a mounting platform including a vertical leg, having a planar portion generally parallel to the vertical axis of the vehicle and a horizontal leg having a planar portion lying in a plane generally parallel to the horizontal axis of the vehicle, said vertical leg being operative to adjustably attach to said vehicle, and said horizontal leg being operative to anchor said bracket to said vehicle.

8. An apparatus according to claim 7, wherein said vertical leg has an elongated aperture aligned with its major axis generally parallel with the vertical axis of the vehicle, said aperture configured to receive a fastener therethrough and being operative to allow adjustment of said mounting platform on said vehicle.

9. A suspension attachment apparatus for use in a motor vehicle having a longitudinal axis, a vertical axis and a transverse axis, each being mutually orthogonal, a chassis, a suspension member depending pivotally from the chassis, a stabilizer bar interposed and connecting the chassis and the suspension member, the stabilizer including a torsional reaction segment running generally transversely across the vehicle and left and right crank arms, each having a first end attached to the torsional segment of the stabilizer bar and a second end adapted for attachment to the vehicle, said suspension attachment apparatus comprising:

an elastomeric body having an aperture adapted to receive the torsional reaction segment therethrough;

a bracket for securing the stabilizer bar within the elastomeric body; and interconnecting means for connecting the bracket to the vehicle, said slidable interconnecting means being configured to be slidably adjustable in a plane generally parallel to the vertical axis of the vehicle, to prevent a pre-loaded condition in the stabilizer bar.

10. An apparatus according to claim 9, wherein said interconnecting means comprises:

a mounting platform including a vertical leg having a planar portion generally parallel to the vertical axis of the vehicle and a horizontal leg having a planar portion lying in a plane generally parallel to the horizontal axis of the vehicle, said vertical leg being operative to adjustably attach to said vehicle, and said horizontal leg being operative to anchor said bracket to said vehicle.

11. An apparatus according to claim 10, wherein said vertical leg has an elongated aperture aligned with its major axis generally parallel with the vertical axis of the vehicle, said aperture configured to receive a fastener therethrough and being operative to allow adjustment of said mounting platform on said vehicle.

12. A vehicle suspension system having a chassis and suspension components, said system comprising;

a stabilizer bar having a portion operatively connected to said chassis and a crank arm operatively connected to one of said suspension components by an adjustable mechanism of variable length;

said adjustable mechanism having first and second members and a fastener device constructed to releasably secure said first and second members together in fixed relationship to each other;

whereby when said stabilizer bar is secured to said chassis and one of said suspension components, said fastener device may be released to allow said first and second members to be displaced so as to relieve any pre-load in said stabilizer bar and then re-secured to hold said first and second members together in a fixed neutral position free of pre-load.

* * * * *